United States Patent
Ray et al.

(10) Patent No.: US 7,416,068 B2
(45) Date of Patent: Aug. 26, 2008

(54) POWER TAKE-OFF CLUTCH CONTROL SYSTEM

(75) Inventors: E. David Ray, White Lake, MI (US); Todd L. Perttola, Holly, MI (US)

(73) Assignee: BorgWarner Inc., Auburn Hills, MI (US)

( * ) Notice: Subject to any disclaimer, the term of this patent is extended or adjusted under 35 U.S.C. 154(b) by 348 days.

(21) Appl. No.: 11/259,651

(22) Filed: Oct. 26, 2005

(65) Prior Publication Data

US 2006/0148616 A1 Jul. 6, 2006

Related U.S. Application Data

(60) Provisional application No. 60/624,607, filed on Nov. 3, 2004.

(51) Int. Cl.
*F16D 48/06* (2006.01)

(52) U.S. Cl. ............... 192/82 T; 192/103 R; 701/67

(58) Field of Classification Search .............. None
See application file for complete search history.

(56) References Cited

U.S. PATENT DOCUMENTS

| | | | |
|---|---|---|---|
| 4,484,653 A | 11/1984 | Horikoshi et al. | |
| 4,499,450 A | 2/1985 | Makita | |
| 5,237,883 A | 8/1993 | Churchill et al. | |
| 5,492,194 A | 2/1996 | McGinn et al. | |
| 5,611,751 A | 3/1997 | Ehrenhardt et al. | |
| 5,690,002 A | 11/1997 | Showalter | |
| 5,740,044 A | 4/1998 | Ehrenhardt et al. | |
| 5,838,591 A | 11/1998 | Yamaguchi | |
| 5,839,328 A | 11/1998 | Showalter | |
| 5,884,738 A | 3/1999 | Joslin et al. | |
| 5,966,999 A | 10/1999 | Showalter et al. | |
| 2003/0134713 A1* | 7/2003 | Senger et al. ............... 477/174 |
| 2003/0150685 A1* | 8/2003 | Iida et al. .................. 192/82 T |

OTHER PUBLICATIONS

"Power Take-Off Clutches", http://www.technodriveusa.com/Power-Take-off-Clutches/power-take-off-clutches.html, Feb. 8, 2002, Technodrive USA.

"AP Power Take Off Clutches for Internal Combustion Engines", http://www.stadcogen.com/apclutch.html, Jan. 28, 2002, Stauffer Diesel Inc.

(Continued)

*Primary Examiner*—Rodney H Bonck
(74) *Attorney, Agent, or Firm*—Warn Partners, P.C.

(57) ABSTRACT

Clutch control systems for a power take-off system of a vehicle, such as those employing all-wheel and four-wheel drive systems. The control system calculates the temperature of the clutch system, based on one or more vehicle operational parameters. If the clutch system reaches a pre-determined temperature limit, the control system selectively stops the operation of the clutch system until the clutch temperature drops below the pre-determined temperature limit. The control system includes an electronic control unit, e.g., a computer or microprocessor, that calculates and/or processes one or more vehicle operational parameters, including, but not limited to: (1) clutch input and output speeds; (2) slip across the clutch; (3) clutch torque; (4) current clutch power; (5) accumulated clutch power; (6) temperature delta (i.e., change) of the clutch; and (7) clutch temperature.

21 Claims, 2 Drawing Sheets

OTHER PUBLICATIONS

Couper, Douglas C., "Engines, power transmission, power take off", Tractor design and operation for research stations, http://www.iita.org/info/trn_mat/irg4/irg43.html, Jan. 28, 2002.

"Power Take-offs",http://www.newage-prm.co.uk/power.htm, Jan. 28, 2002, Newage Transmissions Ltd.

"Isuzu's Torque on Demand", http://www.autoworld.com/news/Isuzu/Torque.htm, Jan. 28, 2002, Auto World / VIS.

"Korando—Torque on Demand and Traction Control", http://autoweb.com.au/start_/showall_on/id_DAE/doc_dae9810292/article.html, Oct. 29, 1998, AutoWeb Pty Limited & Web Publications Pty Ltd.

Nice, Karim, "How Automatic Transmissions Work", http://www.howstuffworks.com/automatic-transmission.htm, Jan. 23, 2002, Howstuffworks, Inc.

* cited by examiner

POWER TAKE-OFF CLUTCH CONTROL SYSTEM

CROSS-REFERENCE TO RELATED APPLICATION

The instant application claims priority to U.S. Provisional Patent Application Ser. No. 60/624,607, filed Nov. 3, 2004, the entire specification of which is expressly incorporated herein by reference.

FIELD OF THE INVENTION

The present invention relates generally to power take-off clutch systems, and more particularly to power take-off clutch control systems that selectively and temporarily stops the operation of the clutch system before the clutch system reaches a pre-determined temperature limit and overheats.

BACKGROUND OF THE INVENTION

The recent introduction of four-wheel and all-wheel drive motor vehicles, including those employing torque-on-demand systems (e.g., BorgWarner Automotive, Inc.'s TOD™ system), has greatly aided in the safety and drivability of these vehicles under sub-optimal road conditions. Some of these types of vehicles also employ a power take-off (PTO) system that is associated with the vehicle's main engine system in order to provide a separate power source to run auxiliary machinery, whether integrated and/or independent, such as mixers, compacters, winches, balers, and the like.

Conventional PTO systems typically include some type of clutch system. Conventional PTO clutch systems typically include an input member, an output member, a clutch pack (e.g., a set of multiple plates or discs), and a control system for selectively engaging the input and output members.

A description of various four wheel drive and torque-on-demand systems can be found with reference to U.S. Pat. No. 5,492,194 to McGinn et al.; U.S. Pat. No. 5,690,002 to Showalter; U.S. Pat. No. 5,839,328 to Showalter; U.S. Pat. No. 5,884,738 to Joslin et al.; and U.S. Pat. No. 5,966,999 to Showalter et al., the entire disclosures of which are incorporated herein by reference.

Because most engine systems used in these types of vehicles can generate far more torque than conventional PTO systems can accept, operators of these vehicles have been keenly aware of the potential damage that can be done to PTO systems by the torque output of the engine system. The most likely cause of damage would occur if the clutch slipped in response to the high torque input level, causing the clutch pack to rapidly overheat, which could then potentially damage the clutch plates. This would then necessitate the time-consuming and costly repair and/or replacement of a portion of, or the entire clutch pack.

Accordingly, it has been suggested that in order to protect the clutch pack, the clutch system temperature must be monitored and the clutch system turned or disabled off before the critical temperature is reached. This can be accomplished by using a temperature sensor to directly measure the temperature of the clutch system.

For example, a temperature sensor can be installed in the clutch assembly to measure the actual temperature of the clutch system. When the measured temperature exceeds the critical temperature, the vehicle's electronic control unit (ECU) would turn off the clutch system until it cools down to an acceptable temperature.

Advantages of such a system would be accurate measurement of clutch system temperature independent of ambient temperature and lube flow and it would allow the ECU to compensate for variations in current due to temperature. Disadvantages of such a system would be the additional cost of sensors and wiring, and if the sensors or wiring failed, the ECU could not protect the clutch system from thermal damage.

Other approaches to solving the above-mentioned problem have also been attempted. Some of these approaches can be found with reference to U.S. Pat. No. 4,484,653 to Horikoshi et al.; U.S. Pat. No. 4,499,450 to Makita; U.S. Pat. No. 5,237,883 to Churchill et al.; U.S. Pat. No. 5,611,751 to Ehrenhardt et al.; U.S. Pat. No. 5,740,044 to Ehrenhardt et al.; and U.S. Pat. No. 5,838,591 to Yamaguchi, the entire disclosures of which are incorporated herein by reference.

Unfortunately, the afore-mentioned approaches do not address the issue of calculating the clutch system temperature without the use of expensive and unreliable temperature sensor systems, but rather focus on other techniques for protecting the clutches of the various PTO-equipped systems.

Therefore, there exists a need for a control system for easily, inexpensively, and reliably calculating the clutch system temperature of a PTO-equipped system so as to be able to selectively and temporarily stop the operation of the clutch system before the clutch system reaches a pre-determined temperature limit, especially for four wheel drive vehicles and more especially for those four wheel drive vehicles employing TOD systems.

SUMMARY OF THE INVENTION

In accordance with the general teachings of the present invention, a new and improved control system for a power take off clutch system is provided. The control system of the present invention is particularly well-suited to use with vehicles employing all-wheel and/or four-wheel drive systems. Additionally, the control system of the present invention is also particularly well-suited to use with vehicles employing torque-on-demand drive systems.

More specifically, the control system of the present invention calculates the temperature of the power take-off clutch system, based on one or more vehicle operational parameters. If the power take-off clutch system reaches a pre-determined temperature limit, the control system of the present invention selectively stops or disables the operation of the power take-off clutch system until the clutch temperature drops below the pre-determined temperature limit.

The control system of the present invention preferably includes an electronic control unit, e.g. a computer or microprocessor, that calculates and/or processes one or more vehicle operational parameters, including, but not limited to: (1) clutch input and output speeds; (2) slip across the clutch; (3) clutch torque; (4) current clutch power; (5) accumulated clutch power; (6) temperature delta of the clutch; and (7) clutch temperature.

In accordance with a first embodiment of the present invention, a control system for a power take off clutch system is provided, wherein the clutch system includes an input member, an output member, a clutch member, and an actuator system for selectively actuating the input and output members, comprising: a speed detection system for detecting the speed of the input member, the first speed detection system operable to generate an electronic signal corresponding to the speed of the input member, the speed detection system operable to detect the speed of the output member, the speed detection system operable to generate an electronic signal corresponding to the speed of the output member, wherein the electronic signal from the speed detection system is processed so as to determine a temperature of the clutch member based upon the electronic signal from the speed detection system, wherein an electronic signal is generated and transmitted to the actuator system so as to cause the disengagement of the clutch member if the temperature of the clutch member exceeds a pre-determined temperature.

In accordance with a second embodiment of the present invention, a control system for a power take off clutch system is provided, wherein the clutch system includes an input member, an output member, a clutch member, and an actuator system for selectively actuating the input and output members, comprising: (1) a speed detection system for detecting the speed of the input member, the first speed detection system operable to generate an electronic signal corresponding to the speed of the input member, the speed detection system operable to detect the speed of the output member, the speed detection system operable to generate an electronic signal corresponding to the speed of the output member; and (2) a slip detection system for detecting slip across the clutch member, the slip detection system operable to generate an electronic signal corresponding to the slip of the clutch member, wherein the electronic signals from the speed detection system and the slip detection system are processed so as to determine a temperature of the clutch member based upon the electronic signals from the speed detection system and the slip detection system, wherein an electronic signal is generated and transmitted to the actuator system so as to cause the disengagement of the clutch member if the temperature of the clutch member exceeds a pre-determined temperature.

In accordance with a third embodiment of the present invention, a control system for a power take off clutch system is provided, wherein the clutch system includes an input member, an output member, a clutch member, and an actuator system for selectively actuating the input and output members, comprising: (1) a speed detection system for detecting the speed of the input member, the first speed detection system operable to generate an electronic signal corresponding to the speed of the input member, the speed detection system operable to detect the speed of the output member, the speed detection system operable to generate an electronic signal corresponding to the speed of the output member; (2) a slip detection system for detecting slip across the clutch member, the slip detection system operable to generate an electronic signal corresponding to the slip of the clutch member; and (3) a torque detection system for detecting torque acting upon the clutch member; the torque detection system operable to generate an electronic signal corresponding to the torque acting upon the clutch member, wherein the electronic signals from the speed detection system, slip detection system and torque detection system are processed so as to determine a temperature of the clutch member based upon the electronic signals from the speed detection system, slip detection system and torque detection system, wherein an electronic signal is generated and transmitted to the actuator system so as to cause the disengagement of the clutch member if the temperature of the clutch member exceeds a pre-determined temperature.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

It should be appreciated that although control system of the present invention is suitable for use with TOD-type systems, it should be appreciated that the present invention can be practiced with any type of electronically-controlled clutches wherein excessive slip and temperature is a concern, such as but not limited to BorgWarner Automotive, Inc.'s Interactive Torque Management™ system. Additionally, the control system of the present invention can be practiced with any type of vehicle, including but not limited to all-wheel drive, four-wheel drive and/or the like.

Figure 1:
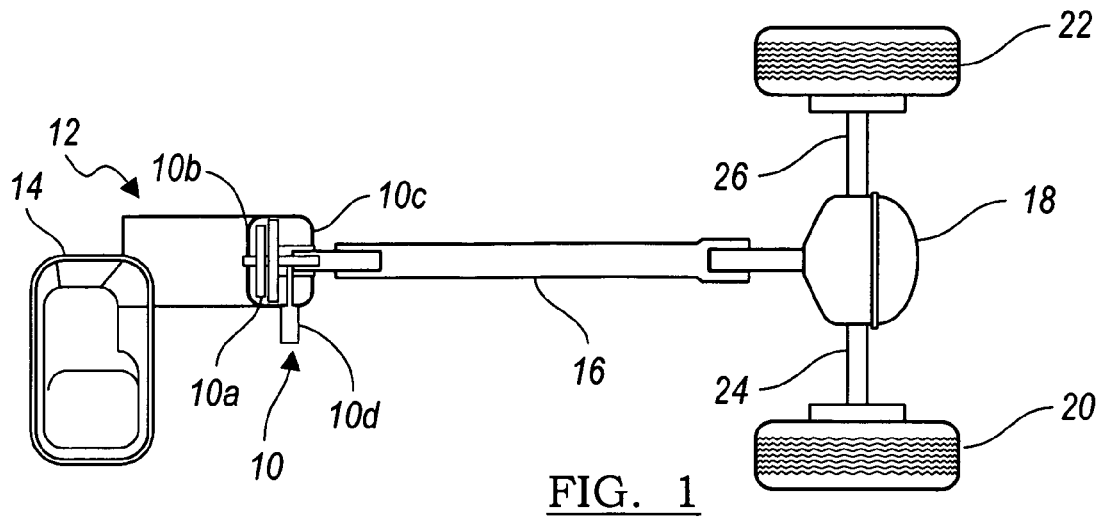
FIG. 1 is a schematic illustration of a drive train system having a power take-off system, in accordance with one embodiment of the present invention.
Figure 2:
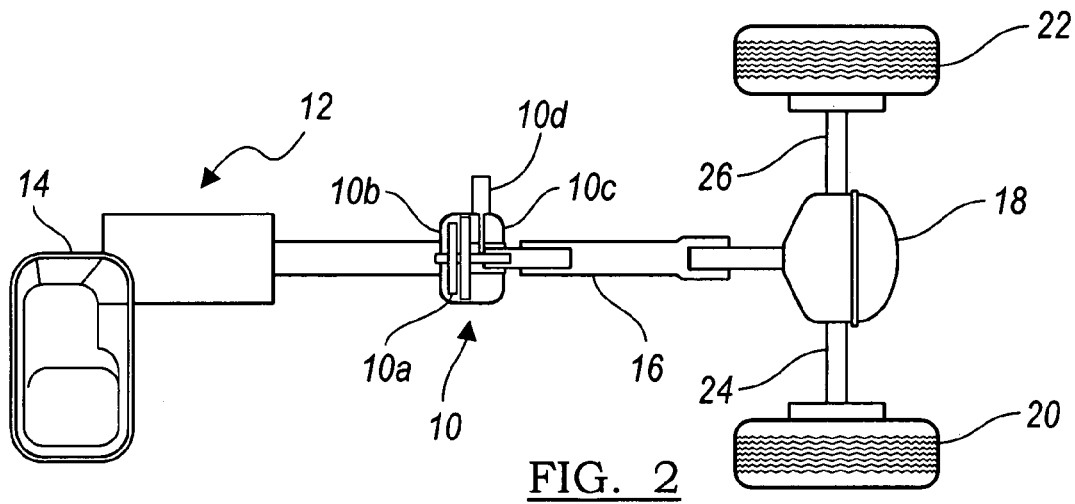
FIG. 2 is a schematic illustration of a first alternative drive train system having a power take-off system, in accordance with a second embodiment of the present invention.
Figure 3:
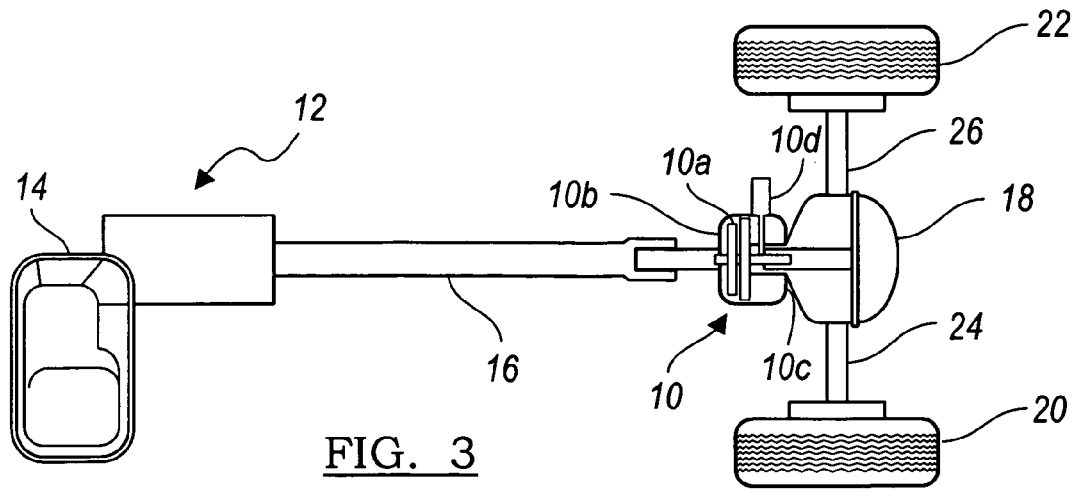
FIG. 3 is a schematic illustration of a second alternative drive train system having a power take-off system, in accordance with a third embodiment of the present invention.

It should also be appreciated that the clutch system of the present invention can be physically outside of the PTO housing itself, provided that the clutch and the PTO system are operably associated therewith. By way of a non-limiting example, reference is made to FIGS. 1-3, wherein the clutch system 10 is shown in three relative positions vis-à-vis the PTO system 12. The clutch system 10 includes a clutch member 10a, an input member 10b, an output member 10c, and an actuator system 10d for selectively actuating the input and output members.

The transmission 14, rear driveshaft 16, rear differential 18 and left and right rear tires 20, 22, respectively, as well as the left and right rear axles 24, 26, respectively, are shown for reference purposes. As previously noted, the clutch system 10 is intended to act as a torsional "fuse" so as to protect the PTO system 12 from damage or breakage. As it tries to act as a "fuse," excessive slip and temperature becomes a concern, which the present invention is intended to prevent or at least lessen the damage therefrom.

Figure 4:
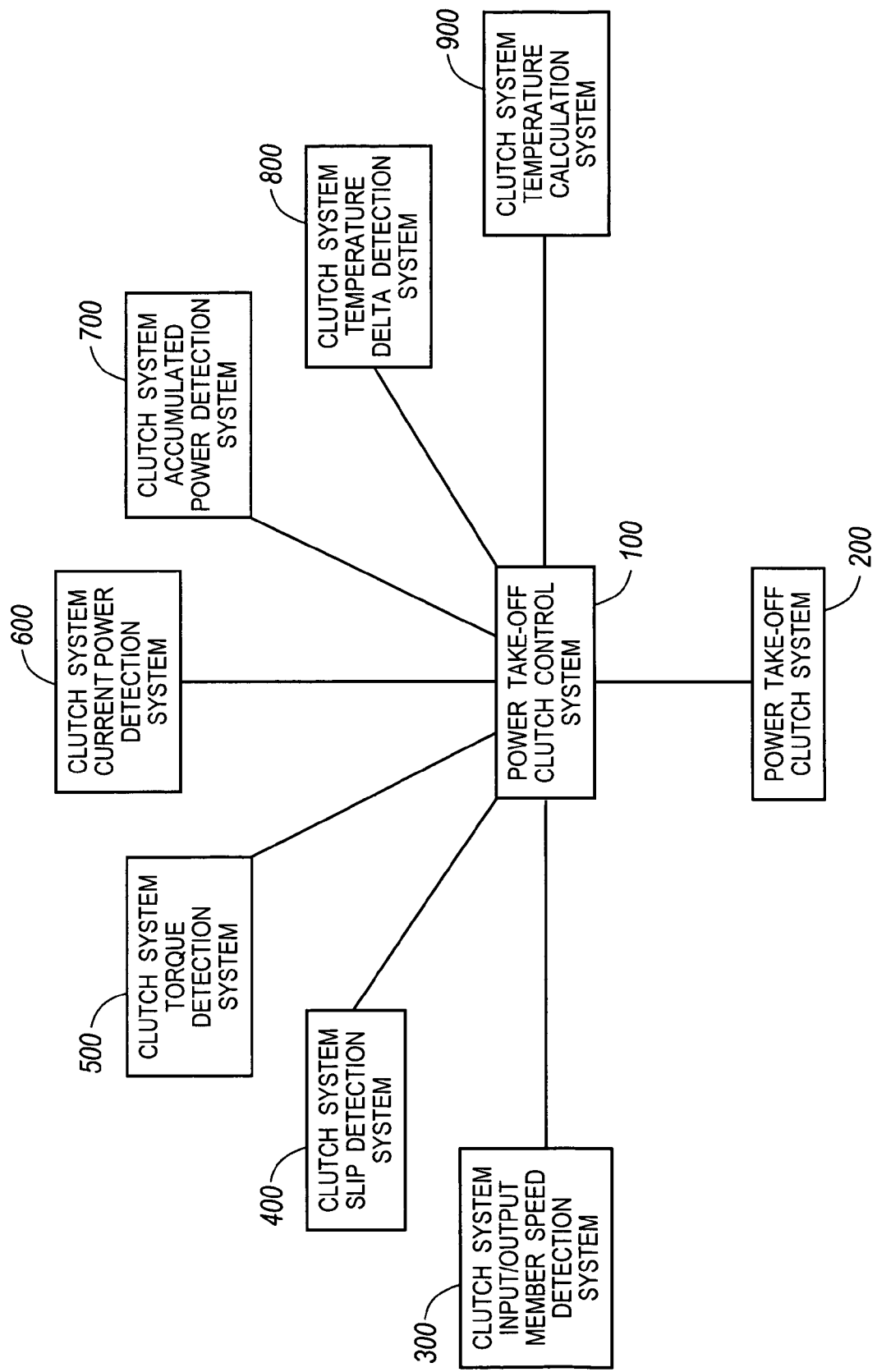
FIG. 4 is a schematic illustration of a control system for a power take-off system, in accordance with the general teachings of the present invention.

Referring to FIG. 4, there is generally shown a schematic illustration of the primary components of a power take-off clutch control system generally shown at 100. It should be appreciated that the illustrated components are not intended to necessarily depict actual discrete physical structures, but rather it is intended to illustrate the general relationship among the various data collection, storage, and transmission functions underlying the present invention. By way of a non-limiting example, all of the functions of the various detection and calculation systems can be performed by, and housed within, the control system of the present invention.

That being said, the power take-off clutch control system 100 is operably associated with and/or in communication (e.g., electrical) with the power take-off clutch system 200.

The power take-off clutch control system 100 is operably associated with and/or in communication (e.g., electrical) with at least one of the following: (1) the clutch system input/output member speed detection system 300; (2) the clutch system slip detection system 400; (3) the clutch system torque detection system 500; (4) the clutch system current power detection system 600; (5) the clutch system accumulated power detection system 700; (6) the clutch system temperature delta (i.e., change) detection system 800; and (7) the clutch system temperature calculation system 900.

As previously noted, the clutch system temperature, especially that of the clutch pack, and more especially that of the clutch plates, must not be allowed to rise above a certain critical temperature where damage to the clutch plates would likely occur. The present invention accomplishes this goal by allowing the vehicle's ECU to calculate the temperature of the clutch system, especially that of the clutch pack, and more especially that of the clutch plates, based on several variables, such as, but not limited to slip, torque and time.

By way of a non-limiting example, when the calculated temperature of the clutch system, and especially that of the clutch pack, and more especially that of the clutch plates, exceeds the pre-established critical temperature, the ECU would automatically disengage or disable (e.g., so it could not transmit torque) the clutch system, and specifically the clutch pack, and more specifically the clutch plates, until it cools down to the appropriate temperature.

There are several advantages to the system of the present invention, as compared to conventional methods. First, no additional costs are incurred to install the system, e.g., sensors, wiring, and so forth. Second, the overall clutch protection is more reliable because there are no sensors/wiring that can potentially fail.

In accordance with the general teachings of the present invention, the ECU performs at least one, and preferably all, of the following calculations with respect to one or more vehicle operational parameters: (1) clutch input and output speeds; (2) slip across the clutch; (3) clutch torque; (4) current clutch power; (5) accumulated clutch power; (6) temperature delta (i.e., change) of the clutch; and (7) clutch temperature. It should be recognized that any number of suitable units of measurement can be used to express the aforementioned vehicle operational parameters, including generally accepted English, metric, and other systems known in the art.

The control system of the present invention is preferably compatible with conventional PTO clutch systems that typically include at least an input member, an output member, a clutch pack (e.g., a set of multiple plates or discs), and a control system for selectively engaging the input and output members.

As previously noted, if the clutch system temperature, especially the clutch pack temperature, and more especially the clutch plates temperature, exceeds the pre-established acceptable limit, the clutch system, and especially the clutch pack, and more especially the clutch plates, is automatically disabled, temporarily or otherwise, until the temperature drops below the preferably pre-determined/pre-set re-enable limit. At that point, normal operation of the clutch system, and specifically the clutch pack, and more specifically the clutch plates, will then continue or resume.

One of the calculations preferably performed by the ECU includes input and output speeds, e.g., both expressed in revolutions per second. The input speed refers to the speed of the input member of the PTO system. The output speed refers to the speed of the output member of the PTO system.

The input and output speeds are the same as propshaft speed and calculated as follows: (1) input speed=(average front speed/tone wheel)×front axle ratio; and (2) output speed=(average rear speed/tone wheel)×rear axle ratio, where the average rear speed is the measured average frequency of the rear wheels in hertz (Hz), and where the average front speed is the measured average frequency of the front wheels in Hz. Tone wheel is the number of teeth on the tone wheels.

Another one of the calculations performed by the ECU includes slip across the clutch, e.g., expressed in radians per second, which is the absolute value of the difference between the input and output speeds. By way of a non-limiting example, the formula for calculating clutch slip is: clutch slip=((Input Speed−Output Speed))×2π/60.

Another calculation performed by the ECU includes clutch torque, e.g., expressed in N-m (i.e., Newton-meters). By way of a non-limiting example, the clutch torque can be determined by performing a table lookup that converts the current duty cycle into clutch torque.

Another calculation performed by the ECU includes current clutch power, e.g., expressed in BTU's. By way of a non-limiting example, the calculated power, in the time interval defined by the torque-on-demand task calculation rate, is: current clutch power=clutch torque×clutch slip×torque-on-demand task rate, wherein the torque-on-demand task rate=execution rate (preferably expressed in seconds) of the calculation. By way of a non-limiting example, the execution rate can be set to set to 10 mS.

Another calculation performed by the ECU includes accumulated clutch power, e.g., expressed in BTU's. The accumulated clutch power is defined as the sum of the total clutch power+current clutch power. Total clutch power is accumulated until a temperature calculation is performed, then it is reset (e.g., to 0) for the next calculation.

Another calculation performed by the ECU includes temperature delta (i.e., change) of the clutch, e.g., expressed in ° C. By way of a non-limiting example, clutch temperature is continuously calculated with a constant period of 500 mS by determining the delta temperature that will result from the clutch power during the calculation period. After the delta temperature is calculated, the accumulated power register is cleared for the next calculation. If the accumulated power is above a threshold, there will be a positive delta temperature resulting in an increase in clutch system temperature, along with a concurrent increase in clutch pack temperature, as well as a concurrent increase in clutch plate temperature. If the accumulated power is below the threshold, there will be a negative delta resulting in a decrease in clutch system temperature, along with a concurrent decrease in clutch pack temperature, as well as a concurrent decrease in clutch plate temperature.

The final calculation performed by the ECU includes clutch temperature, e.g., expressed in ° C. The temperature delta is constantly accumulated to determine actual clutch temperature. If the clutch temperature is above a pre-determined/pre-set limit that is preferably pre-programmed into the ECU, an optional clutch control system (e.g., actuation system 10*d* shown in FIGS. 1-3), selectively operable with the clutch, will be actuated (e.g., via an electronic signal from the ECU) to either temporarily disengage, disable and/or shut down the clutch and/or the clutch pack and/or the clutch plates until the clutch and/or clutch pack and/or clutch plates has reached an acceptable temperature (i.e., cooled down) that is also preferably pre-programmed into the ECU.

Therefore, the system of the present invention can be easily adapted to employ the computing and micro-processing capabilities of ECU's of existing vehicles to perform the aforementioned calculations. By way of a non-limiting example, an ECU can be easily programmed to perform these calculations, store the relevant data, and take appropriate action (e.g., disabling the PTO clutch system) based on the stored data.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A control system for a power take off clutch system, wherein the clutch system includes an input member, an output member, a clutch member, and an actuator system for selectively actuating the input and output members, comprising:
   a speed detection system for detecting the speed of the input member, the speed detection system operable to generate an electronic signal corresponding to the speed of the input member, the speed detection system operable to detect the speed of the output member, the speed detection system operable to generate an electronic signal corresponding to the speed of the output member;
   wherein the electronic signal from the speed detection system is processed so as to determine a temperature of the clutch member based upon the electronic signal from the speed detection system;
   wherein an electronic signal is generated and transmitted to the actuator system so as to cause the disengagement of the clutch member if the temperature of the clutch member exceeds a pre-determined temperature; and
   an accumulated power detection system for detecting the accumulated power of the clutch member, the accumulated power detection system operable to generate an electronic signal corresponding to the accumulated power of the clutch member, wherein the electronic signal from the accumulated power detection system is processed so as to determine the temperature of the clutch member.

2. The invention according to claim 1, further comprising a slip detection system for detecting slip across the clutch member, the slip detection system operable to generate an electronic signal corresponding to the slip of the clutch member, wherein the electronic signal from the slip detection system is processed so as to determine the temperature of the clutch member.

3. The invention according to claim 1, further comprising a torque detection system for detecting torque acting upon the clutch member; the torque detection system operable to generate an electronic signal corresponding to the torque acting upon the clutch member, wherein the electronic signal from the torque detection system is processed so as to determine the temperature of the clutch member.

4. The invention according to claim 1, further comprising a current power detection system for detecting the current power of the clutch member; the current power detection system operable to generate an electronic signal corresponding to the current power of the clutch member, wherein the electronic signal from the current power detection system is processed so as to determine the temperature of the clutch member.

5. The invention according to claim 1, further comprising a temperature change detection system for detecting the temperature change of the clutch member; the temperature change detection system operable to generate an electronic signal corresponding to the temperature change of the clutch member, wherein the electronic signal from the temperature change detection system is processed so as to determine the temperature of the clutch member.

6. The invention according to claim 1, further comprising a temperature calculation system for calculating the temperature of the clutch member; the temperature calculation system operable to generate an electronic signal corresponding to the temperature of the clutch member, wherein the electronic signal from the temperature calculation system is processed so as to determine the temperature of the clutch member.

7. The invention according to claim 1, wherein the control system is operably associated with a drive system selected from the group consisting of all-wheel, four-wheel, and combinations thereof.

8. The invention according to claim 1, wherein the control system is operably associated with a drive system selected from the group consisting of torque on demand systems, interactive torque management systems, and combinations thereof.

9. A control system for a power take off clutch system, wherein the clutch system includes an input member, an output member, a clutch member, and an actuator system for selectively actuating the input and output members, comprising:
   a speed detection system for detecting the speed of the input member, the speed detection system operable to generate an electronic signal corresponding to the speed of the input member, the speed detection system operable to detect the speed of the output member, the speed detection system operable to generate an electronic signal corresponding to the speed of the output member; and
   a slip detection system for detecting slip across the clutch member, the slip detection system operable to generate an electronic signal corresponding to the slip of the clutch member;
   wherein the electronic signals from the speed detection system and the slip detection system are processed so as to determine a temperature of the clutch member based upon the electronic signals from the speed detection system and the slip detection system;
   wherein an electronic signal is generated and transmitted to the actuator system so as to cause the disengagement of the clutch member if the temperature of the clutch member exceeds a pre-determined temperature; and
   an accumulated power detection system for detecting the accumulated power of the clutch member, the accumulated power detection system operable to generate an electronic signal corresponding to the accumulated power of the clutch member, wherein the electronic signal from the accumulated power detection system is processed so as to determine the temperature of the clutch member.

10. The invention according to claim 9, further comprising a torque detection system for detecting torque acting upon the clutch member; the torque detection system operable to generate an electronic signal corresponding to the torque acting upon the clutch member, wherein the electronic signal from the torque detection system is processed so as to determine the temperature of the clutch member.

11. The invention according to claim 9, further comprising a current power detection system for detecting the current power of the clutch member; the current power detection system operable to generate an electronic signal corresponding to the current power of the clutch member, wherein the electronic signal from the current power detection system is processed so as to determine the temperature of the clutch member.

12. The invention according to claim 9, further comprising a temperature change detection system for detecting the temperature change of the clutch member; the temperature change detection system operable to generate an electronic signal corresponding to the temperature change of the clutch member, wherein the electronic signal from the temperature change detection system is processed so as to determine the temperature of the clutch member.

13. The invention according to claim 9, further comprising a temperature calculation system for calculating the temperature of the clutch member; the temperature calculation system operable to generate an electronic signal corresponding to the temperature of the clutch member, wherein the electronic signal from the temperature calculation system is processed so as to determine the temperature of the clutch member.

14. The invention according to claim 9, wherein the control system is operably associated with a drive system selected from the group consisting of all-wheel, four-wheel, and combinations thereof.

15. The invention according to claim 9, wherein the control system is operably associated with a drive system selected from the group consisting of torque on demand systems, interactive torque management systems, and combinations thereof.

16. A control system for a power take off clutch system, wherein the clutch system includes an input member, an output member, a clutch member, and an actuator system for selectively actuating the input and output members, comprising:
  a speed detection system for detecting the speed of the input member, the speed detection system operable to generate an electronic signal corresponding to the speed of the input member, the speed detection system operable to detect the speed of the output member, the speed detection system operable to generate an electronic signal corresponding to the speed of the output member;
  a slip detection system for detecting slip across the clutch member, the slip detection system operable to generate an electronic signal corresponding to the slip of the clutch member; and
  a torque detection system for detecting torque acting upon the clutch member; the torque detection system operable to generate an electronic signal corresponding to the torque acting upon the clutch member;
  wherein the electronic signals from the speed detection system, slip detection system and torque detection system are processed so as to determine a temperature of the clutch member based upon the electronic signals from the speed detection system, slip detection system and torque detection system;
  wherein an electronic signal is generated and transmitted to the actuator system so as to cause the disengagement of the clutch member if the temperature of the clutch member exceeds a pre-determined temperature; and
  an accumulated power detection system for detecting the accumulated power of the clutch member, the accumulated power detection system operable to generate an electronic signal corresponding to the accumulated power of the clutch member, wherein the electronic signal from the accumulated power detection system is processed so as to determine the temperature of the clutch member.

17. The invention according to claim 16, further comprising a current power detection system for detecting the current power of the clutch member; the current power detection system operable to generate an electronic signal corresponding to the current power of the clutch member, wherein the electronic signal from the current power detection system is processed so as to determine the temperature of the clutch member.

18. The invention according to claim 16, further comprising a temperature change detection system for detecting the temperature change of the clutch member; the temperature change detection system operable to generate an electronic signal corresponding to the temperature change of the clutch member, wherein the electronic signal from the temperature change detection system is processed so as to determine the temperature of the clutch member.

19. The invention according to claim 16, further comprising a temperature calculation system for calculating the temperature of the clutch member; the temperature calculation system operable to generate an electronic signal corresponding to the temperature of the clutch member, wherein the electronic signal from the temperature calculation system is processed so as to determine the temperature of the clutch member.

20. The invention according to claim 16, wherein the control system is operably associated with a drive system selected from the group consisting of all-wheel, four-wheel, and combinations thereof.

21. The invention according to claim 16, wherein the control system is operably associated with a drive system selected from the group consisting of torque on demand systems, interactive torque management systems, and combinations thereof.

* * * * *